3,444,045
PROCESS FOR PURIFYING STREPTOKINASE

Edward Clarence Derenzo, Hillsdale, and Paul Hadley Bell, Ridgewood, N.J., assignors to American Cyanamid Company, Stamford, Conn., a corporation of Maine
No Drawing. Filed Sept. 20, 1966, Ser. No. 580,584
Int. Cl. C12d
U.S. Cl. 195—66     10 Claims

ABSTRACT OF THE DISCLOSURE

Streptokinase is purified by partially purifying impure streptokinase by admixing with a phosphate buffer (0.15–0.25 M), contacting the mixture with DEAE-cellulose whereby some of the impurities are removed on the DEAE-cellulose while the streptokinase is retained in the filtrate, repeating the first treatment using a 0.1–0.15 M phosphate buffer whereby a pure streptokinase is eluted.

---

Generally stated, the subject matter of the present invention relates to a process of purifying streptokinase. More particularly, the invention relates to a batch chromatography process employing cellulose ion exchange resins and a phosphate buffer. Furthermore, the invention relates to a process of purifying streptodornase.

Streptokinase and streptodornase are fermentation products of hemolytic streptococci. It has been established that both materials play active roles in the lysis of materials occasioned by organic disorders in mammals. Streptokinase is active in the dissolution of blood clots and particularly exudates which are rich in fibrin components. Depending on the nature and size of these clots, streptokinase, or streptokinase in the presence of human plasminogen effects the dissolution of such clots. Streptodornase acts directly upon a substrate of desoxyribonucleoprotein and desoxyribonucleic acid, which are the main constituents in the nuclei and constitute 30 to 70% of the sediment of purulent exudates. Streptodornase splits the nucleoprotein, and thus causes a marked drop in the viscosity of purulent exudates.

The use of both streptokinase and streptodornase has, to a degree, been limited as a consequence to contamination. Contamination arises as a consequence to the presence of streptococci protein by-products which give rise to a toxic reaction such as anoxia, cyanosis, chills and the like.

The present invention represents the culmination of a long series of investigations conducted largely by the inventors and their associates in the problems encountered in attempts to purify streptokinase. Essentially the present invention relates to a novel method of purifying streptokinase, which is both feasible and economical and will yield a product purified from 2 to 10 times. The process of the present invention employs batch chromatography utilizing cellulose ion exchangers and phosphate buffers, the major innovation residing in the fact that a portion of contaminants are removed from the impure material prior to selectively adsorbing the active material on the cellulose ion exchange resin.

The prior art discloses several processes for purifying streptokinase which employ adsorption and elution principles, utilizing ion exchangers such as DEAE-sephadex or DEAE-cellulose, U.S. Patent No. 2,997,425, Singher et al., U.S. Patent No. 3,042,586, Siegel et al., U.S Patent No. 3,107,203, Baumgarten et al., and U.S. Patent No. 3,226,304, Siiteri et al., disclose the utilization of adsorption and elution in the purification of streptokinase.

Two important elements of the process of the present invention especially distinguish same from the prior art. One novel and particularly distinguishing element of the present invention is that by proper choice of phosphate buffer concentration and other conditions, the first contact of the impure material with cellulose ion exchange resin serves to adsorb the impurities rather than the streptokinase. In this manner a substantial amount of contaminants are retained on the adsorbent and later discarded, while the filtrate contains the now partially purified streptokinase. Procedures of the prior art, in contrast to the present invention, contact the streptokinase solution to be purified with the cellulose ion exchange resin under such conditions so as to adsorb not only the contaminating material but also streptokinase as well. The prior art processes then resort to selective elution to obtain the purified streptokinase. In the process of the present invention the impurities are adsorbed while the streptokinase remains in solution.

A further novel and distinguishing element of the present invention is found wherein the filtrate containing the partially purified streptokinase is brought into contact with a second portion of cellulose ion exchange resin under selected conditions so as to achieve adsorption of a maximum amount of streptokinase and a minimum amount of contaminating impurities. Whereas, the prior art processes employ adsorption conditions so that a maximum amount of streptokinase together with impurities was adsorbed on the ion exchange resin, and purification was then achieved by selective elution. Therefore, the present invention provides adsorption conditions in which a maximum of streptokinase is adsorbed while adsorption of impurities is held to a minimum.

Broadly stated, the manner of carrying out the present invention is as follows: The cellulose ion exchange resin is conditioned for use by slurrying in water, and adjusting the pH to about 7 with 1 M sodium dihydrogen phosphate. The cellulose ion exchange resin is then further conditioned by twice slurrying for periods of approximately 30 minutes, with a buffer solution having the same pH and molarity as that solution employed with the impure streptokinase.

The impure streptokinase, which is purified according to the process of the present invention, may be obtained by any of the known, art accepted procedures. Generally, this is accomplished by using Streptococcus hemolyticus as an inoculum on a growth medium and allowing bacterial growth to proceed for 8 to 10 hours, at that time fermentation is stopped by passing the broth through cooling coils and the bacterial cells are removed by centrifugation or filtration. Depending on the processes employed, the impure material may be primarily comprised of the enzyme streptokinase or may also contain, in addition, the enzyme streptodornase. Streptokinase may be isolated from the broth by employing any of the art accepted procedures. Streptokinase may be preconditioned to remove salts by dialysis against a portion of the identical buffer solution utilized in conditioning the cellulose ion exchange resin, or the desalting may be effected by other conventional means. Streptokinase preparations free of inorganic salts may be used directly. Alternatively, the impure preparation may be partially purified by precipitation in the presence of a high concentration of inorganic salts, as for example, sodium chloride. Under such conditions streptokinase is recovered in the precipitate, and the soluble impurities discarded after filtration or centrifugation. The precipitate is freed of salts by one of a variety of conventional methods and is then treated as hereinafter set forth. Ordinarily, a solution of impure streptokinase is dissolved in a phosphate buffer to a protein concentration of from about 10 to 30 mg./ml., preferably 20 mg./ml. The protein concentration may be measured by determining the ultraviolet adsorbence at 280 millimicrons of solution. A solution which has an optical density of 1 through 1 cm. light path is taken to contain a protein concentration of 1 mg./ml. Therefore, the protein content of the sample may also be expressed in terms of absorbence units. Absorbence units are obtained by multiplying the optical density at 280 m$\mu$ through a 1 cm. light path, by the volume of the sample expressed in milliliters. The streptokinase purity of a particular solution may then be expressed in terms of its specific activity, which is defined as the number of streptokinase units per mg. of protein, or per absorbence unit as hereinabove defined. Streptokinase units are expressed in terms of the Christensen unit which is described in the Journal of Clinical Investigation (1949), vol. 28, p. 163.

The molar concentration of the phosphate buffer employed to both condition the cellulose ion exchange resin prior to its use, and to dilute the impure streptokinase may be from about 0.15 to 0.25 M, preferably 0.2 M. The pH of the phosphate buffer solutions used throughout the processes of the present invention, irrespective of molar concentration, is ordinarily adjusted to 7, but buffer solutions within the range of 6 to 8.5 may be employed.

The impure streptokinase is slurried with preconditioned cellulose ion exchange resin such as DEAE-cellulose, under conditions chosen so as to achieve the selective adsorption of impurities while the streptokinase remains in the supernatant liquid. Several variables are particularly important in carrying out the above adsorption such as the amount of cellulose ion exchange resin, as well as slurrying time. The amount of cellulose ion exchange resin is determined by employing a ratio of about 3 mg. of resin, dry weight, to 1 mg. of protein in the initial absorption. Slurrying time is about 1 hour. Experimental results indicate that approximately 20 to 30% of the contaminating material is removed at this point. Optionally, and depending on the degree of purification desired, the above step may be repeated employing a new portion of cellulose ion exchange resin, thereby removing an additional 20 to 30% of impurities. In addition, a loss of 10% of streptokinase activity is occasioned in each adsorption step.

The supernatant liquid containing the now partially purified streptokinase is diluted with water to a specific protein concentration and phosphate buffer molarity, and again subjected to adsorption on a fresh portion of the cellulose ion exchange resin. The conditions of adsorption are so chosen as to selectively adsorb the streptokinase with a minimum of contaminant adsorption. The solution is adjusted to a phosphate buffer molar concentration of from about 0.01 to 0.05, preferably 0.0175 to 0.025, while the protein concentration is adjusted to a concentration of from about 0.5 to 3 mg./ml., preferably 1 to 1.5 mg./ml. To achieve optimum adsorption, the variables of molar concentration and protein concentration must be kept within relatively narrow limits. The concentration of cellulose ion exchange resin employed at this step is approximately 6 mg. of cellulose ion exchange resin to 1 mg. of protein.

The filtrate from the adsorption is discarded, a purified streptokinase is then eluted from the cellulose ion exchange resin employing a molar concentration of phosphate buffer of from 0.1 to 0.15. The elution of the streptokinase may be repeated with additional eluate and the two eluates then combined. While a double elution ordinarily produces higher yields of streptokinase, there is a concomitant higher yield of impurities.

The eluate containing the purified streptokinase may then be lyophilized to a solid product, employing any of the conventional procedures known to the art. Impure streptokinase employing the novel process of the present invention is purified from 2 to 10 fold with a recovery of approximately 40 to 60% of streptokinase activity.

Since the impure material may also contain streptodornase, in addition to the streptokinase, the present invention provides for the purification of streptodornase. Presuming that the impure material contains streptodornase, the above cellulose ion exchange resin from which the streptokinase has been eluted is suspended in a 0.1 M phosphate buffer, which may also contain 0.1 to 0.5 M of sodium chloride or equivalent salt. The pH of the mixture is adjusted from 8.5 to 10.5, and stirred for approximately 1 hour; during this period the strepdornase is stripped from the resin. The mixture is then filtered, and the pH of the filtrate containing the streptodornase is adjusted to 7.5 to insure the stability of the streptodornase. Employing the novel process of the present invention, 40 to 60% of streptodornase activity is recovered.

Therefore, the invention relates to a process of purifying streptokinase which comprises admixing impure streptokinase with a phosphate buffer having a molar concentration of from about 0.15 to 0.25, contacting the mixture with DEAE-cellulose, previously conditioned with a phosphate buffer having a molar concentration of from about 0.15 to 0.25, filtering the mixture and retaining the filtrate, adjusting the filtrate to a phosphate buffer molar concentration of from about 0.01 to 0.05, and a protein concentration of from about 0.5 to 3 mg./ml., contacting the adjusted filtrate with DEAE-cellulose, previously conditioned with a phosphate buffer having a molar concentration of from about 0.15 to 0.25, stirring and then eluting the streptokinase from the cellulose with a phosphate buffer having a molar concentration of from about 0.1 to 0.15. In addition, the invention relates to the purification of streptodornase, which comprises suspending DEAE-cellulose, which contains streptodornase and from which the streptokinase has been removed, in a phosphate buffer having a molar concentration of 0.1, adjusting the pH of the mixture from about 8.5 to 10.5, stirring and filtering the mixture and retaining the filtrate which contains the streptodornase.

The phosphate buffers employed in the novel process of the present invention, are well known in the art and may be chosen from the alkali and alkaline earth, mono, di or tri phosphates. Since the process of the present invention depends on the selective adsorption of impurities on one hand, and the selective adsorption of streptokinase on the other, both steps are dependent on the presence of precise molar concentrations of ions. Is is understood, then, that the phosphate buffers herein employed and described may be modified to include other ionic substances such as sodium chloride, or other common salts. Whereas, the cellulose ion exchange resin employed in the novel process of the present invention, that is DEAE-cellulose or its equivalent, is generally described by Peterson and Sober (JACS 78:751, 1956).

The following examples are provided for illustrative purposes and may include particular features of the invention, however, the examples should not be construed as limiting the invention, many variations of which are possible without departing from the spirit or scope thereof.

EXAMPLE I

Partial purification of streptokinase

This example demonstrates the partial purification of streptokinase employing a process involving precipitation of streptokinase in the presence of a high concentration of inorganic salts.

A 5 gm. sample of impure streptokinase is dissolved in 50 ml. of a 0.1 M sodium phosphate buffer solution. The solution contains $10.7 \times 10^6$ units of streptokinase and 2600 absorbence units of protein, having a specific activity equivalent to 4100 units per absorbence unit. To this solution 5 gm. of sodium chloride is added and the pH of the solution is adjusted to 2 with hydrochloric acid. The precipitate is collected by centrifugation, resuspended in 100 ml. of water, adjusting the pH to 4.5 with sodium hydroxide, centrifuged, and the supernatant containing sodium chloride and other impurities is discarded. The precipitate is resuspended in 100 ml. of water and the pH is adjusted to 4.5. The mixture is centrifuged, and the precipitate is dissolved in 16 ml. of 0.2 M phosphate buffer, pH 7 to 7.5. The final solution on analysis contains $9.3 \times 10^6$ units of streptokinase and 1220 absorbence units of protein, specific activity equivalent to 7400 units per absorbence units.

EXAMPLE II

Effect of molar concentration on adsorption

This example demonstrates the effect of various molar concentrations of phosphate buffer on the adsorption of streptokinase, and the adsorption of impurities onto a cellulose ion exchange resin.

A 75 ml. sample of an impure streptokinase preparation on 0.2 M sodium phosphate buffer, pH 7, containing $33.6 \times 10^6$ streptokinase units, 867 adsorbence units of protein and a specific activity equivalent to 39000 units per absorbence unit are divided into three equal portions of 25 ml. The solutions are approximately diluted to molar concentrations of 0.05, 0.025 and 0.01. Both the 0.05 M and the 0.025 M samples are further diluted with appropriate buffer solutions to achieve a protein concentration equivalent to the 0.01 M sample. The equivalent of 1.65 gm. of dry DEAE-cellulose, preconditioned with the buffers employed in the samples, is added to each sample. The mixtures are stirred with the aid of a mechanical stirrer for approximately 1 hour and filtered. The adsorption procedure is repeated twice, employing fresh portions of preconditioned DEAE-cellulose, and the filtrates are separately maintained and individually analyzed.

The filtrate is diluted with distilled water to bring the molarity of the phosphate buffer to 0.025 M, and the equivalent of 1.625 gm. of dry DEAE-cellulose, previously conditioned with 0.025 M sodium phosphate, pH 7, is added to the filtrate and the mixture is stirred for 1 hour. The mixture is filtered and the DEAE-cellulose cake is saved. The filtrate is found to contain $0.6 \times 10^6$ units of streptokinase and 88 absorbence units of protein, having a specific activity equal to 6800 units per absorbence unit, whereas, the DEAE-cellulose cake contains 94% of streptokinase activity, and 63% of the protein originally present in the 0.025 M phosphate solution. This corresponds to 70.4% of the original streptokinase and 32.7% of the original protein.

The DEAE-cellulose cake is washed free of occluded material by stirring in 25 ml. of 0.025 M sodium phosphate buffer for approximately 30 minutes. The mixture is filtered and the wash discarded. Streptokinase is eluted from the cake by suspending it in 25 ml. of 0.1 M sodium phosphate buffer solution, which is 0.5 M with respect to sodium chloride, and stirred for 1 hour. The mixture is filtered and the cake discarded. The eluate contains $7.3 \times 10^6$ units of streptokinase and 115 absorbence units of protein, having a specific activity equal to 63000 units per absorbence unit. The yield of streptokinase is approximately 55.7%.

EXAMPLE IV

Utilization of different molar concentrations in eluting streptokinase

This example demonstrates the utilization of different molar concentrations in eluting streptokinase from DEAE-cellulose.

A 2.7 gm. sample of a salt free impure streptokinase preparation is dissolved in 100 ml. of 0.2 M sodium phosphate buffer solution, pH 7. The solution contains $51.7 \times 10^6$ units of streptokinase and 1760 absorbence units of protein, having a specific activity equal to 29400 units per absorbence unit. The equivalent of 6.5 gm. of dry DEAE-cellulose previously conditioned with 0.2 M sodium phosphate, pH 7, is added to the above solution and the mixture is stirred with the aid of a mechanical stirrer for approximately 1 hour. The mixture is filtered and the filtrate which contains streptokinase is retained. The filtrate contains $42.5 \times 10^6$ units of streptokinase, and 1160 absorbence units of protein, having a specific activity equal to 36600 units per absorbence unit. The adsorption procedure is repeated employing a new portion of DEAE-cellulose, which is previously conditioned as hereinabove described, and the mixture is filtered.

The filtrate, which contains $36.6 \times 10^6$ units streptokinase, and 885 absorbence units of protein, having a specific activity equal to 42700 units per absorbence unit, is diluted with distilled water to bring the molar concentration of the sodium phosphate buffer to 0.025 M. The equivalent of 6.7 gm. of dry DEAE-cellulose, which is previously conditioned as hereinabove set forth, is added to the filtrate and the mixture is stirred for approximately 1 hour. The mixture is filtered and the remaining DEAE-cellulose cake retained.

The DEAE-cellulose cake which contains 57% of the original streptokinase activity and 27% of the protein, is washed free of occluded material by stirring in 100 ml. of 0.025 M sodium phosphate buffer, pH 7, for approxi-

TABLE 1

| Phosphate buffer molarity | Initial analysis | | | First absorption analysis | | | Second absorption analysis | | | Third absorption analysis | | |
|---|---|---|---|---|---|---|---|---|---|---|---|---|
| | S.K.[1] | O.D.[2] | S.A.[3] | S.K.[1] | O.D.[2] | S.A.[3] | S.K.[1] | O.D.[2] | S.A.[3] | S.K.[1] | O.D.[2] | S.A.[3] |
| 0.05 | $11.2 \times 10^6$ | 289 | 3,900 | $8.5 \times 10^6$ | 204 | 42,000 | $5.9 \times 10^6$ | 155 | 38,200 | $4.2 \times 10^6$ | 133 | 32,000 |
| 0.025 | $11.2 \times 10^6$ | 289 | 3,900 | $1.92 \times 10^6$ | 134 | 14,300 | 0 | 90 | -------- | 0 | 80 | -------- |
| 0.01 | $11.2 \times 10^6$ | 289 | 3,900 | 0 | 81 | -------- | 0 | 60 | -------- | 0 | 57 | -------- |

[1] S.K.=streptokinase.
[2] O.D.=optical density.
[3] S.A.=specific activity.

It should be clearly evident from the foregoing table that a molar concentration of phosphate buffer of 0.025 M gives the optimum results with respect to adsorbing a maximum of streptokinase and a minimum of impurities.

EXAMPLE III

Purification of streptokinase

This example demonstrates the process of purifying streptokinase, employing the inventive concept of the present invention.

A salt free preparation of impure streptokinase, 0.82 gm., is dissolved in 25 ml. of 0.2 M sodium phosphate buffer solution, pH 7. The solution contains $13.1 \times 10^6$ units of streptokinase and 460 absorbence units of protein, having a specific activity equivalent to 28600 units per absorbence unit. The equivalent of 1.625 gm. of dry DEAE-cellulose, previously conditioned with 0.2 M sodium phosphate buffer, is added to the streptokinase solution and the mixture is stirred mechanically for approximately 1 hour. The mixture is filtered and the DEAE-cellulose cake is discarded. The filtrate contains $11.3 \times 10^6$ units of streptokinase and 320 absorbence units of protein, having a specific activity equivalent to 35200 units per absorbence unit. The adsorption is repeated employing a new portion of DEAE-cellulose, preconditioned with 0.2 M sodium phosphate buffer, and the mixture is filtered. The filtrate contains $9.8 \times 10^6$ units of streptokinase, and 238 absodbence units of protein, having a specific activity equal to 41000 units per absorbence unit. In other terms the filtrate now contains 75% of the original streptokinase activity and 52% of the original protein.

mately 30 minutes. The mixture is filtered, and the filtrate is discarded. The remaining DEAE-cellulose cake is divided into 2 equal parts by weight. The streptokinase is eluted from one portion by suspending it in 50 ml. of 0.1 M phosphate buffer, pH 7, and is stirred for approximately 1 hour. The streptokinase is eluded from the other portions by suspending same in 50 ml. of 0.1 M phosphate buffer, pH 7, which is 0.5 M with respect to sodium chloride, and is stirred for approximately 1 hour. Both mixtures are filtered, and the elutions are repeated employing like quantities of respective eluting solutions and the filtrates are combined. The results of the elutions are hereinbelow listed in tabular form:

TABLE 2

|  | Portion 1 | Portion 2 |
|---|---|---|
| Eluting solution | 0.1 M phosphate buffer | 0.1 M phosphate buffer and 0.5 M sodium chloride. |
| Streptokinase units | $10.2 \times 10^5$ | $13.6 \times 10^6$. |
| Absorbence units | 142 | 224. |
| Specific activity | 71,000 | 60,700. |
| Yield | 40.3% | 54.8%. |

EXAMPLE V

Purification of streptokinase

This example demonstrates the process of purifying streptokinase, employing the inventive concept of the present invention.

A 25 ml. mixture of a salt free impure preparation of streptokinase and streptodornase in 0.2 M sodium phosphate, which contains $3 \times 10^6$ units of streptokinase, and 787 absorbence units of protein, having specific activity equal to 3810 units per absorbence unit, and 4 million units of streptodornase, is added to 1.625 gm. of dry DEAE-cellulose, previously conditioned in the manner set forth in Example IV, stirred for approximately 1 hour and filtered. The DEAE-cellulose cake is discarded, and the filtrate which contains $2.9 \times 10^6$ units of streptokinase, and 340 absorbence units of protein, having a specific activity equivalent to 8540 units per absorbence unit, is added to 1.625 gm. of a new portion of DEAE-celulose, previously conditioned in the manner set forth in Example IV, filtered and the DEAE-cellulose cake is discarded.

The filtrate which contains $2.6 \times 10^6$ units of streptokinase, and 215 absorbence units of protein, having a specific activity equal to 12100 units per absorbence unit, or in other words 87% of the original streptokinase activity, is diluted with distilled water to a sodium phosphate molar concentration of 0.025 M. The filtrate is then added to 1.625 gm. of a dry DEAE-cellulose, previously conditioned in the manner set forth in Example IV, stirred and filtered.

The filtrate is discarded and the DEAE-cellulose cake is washed free of occluded material by stirring in 0.025 M of sodium phosphate. The mixture is filtered and the wash discarded. The streptokinase is eluted from the DEAE-cellulose cake with 25 ml. of 0.1 M sodium phosphate, pH 7. The eluate contains $1.2 \times 10^6$ of streptokinase and 27 absorbence units of protein, having a specific activity equal to 44,000 units per absorbence unit. The overall yield of streptokinase is 40%.

EXAMPLE VI

Purification of streptodornase

This example demonstrates the utilization of the inventive concept of the present invention in the process of purifying streptodornase.

The DEAE-cellulose cake of Example V, from which the streptokinase has been eluted, is suspended in 25 ml. of a 0.1 M sodium phosphate buffer, pH 7. The pH is adjusted to 9 to 10 with 1 N sodium hydroxide solution, stirred for approximately 1 hour during which time the streptodornase is eluted. The mixture is filtered and the pH of the filtrate is adjusted to 7.5, yielding 2 million units of streptodornase.

Although the invention has been described and illustrated by reference to particular embodiments thereof, it will be understood that in its broadest aspects the invention is not limited to such embodiments, and that variations and substitution of such equivalents may be resorted to within the scope of the appended claims.

What is claimed is:
1. A process which comprises:
 (a) admixing impure streptokinase with a phosphate buffer having a molar concentration of from about 0.15 to 0.25,
 (b) contacting the mixture with DEAE-cellulose, previously conditioned with a phosphate buffer having a molar concentration of from about 0.15 to 0.25,
 (c) filtering the mixture and retaining the filtrate,
 (d) adjusting the filtrate to a phosphate buffer molar concentration of from about 0.01 to 0.05, and a protein concentration of from about 0.5 to 3 mg./ml.,
 (e) contacting the adjusted filtrate with DEAE-cellulose, previously conditioned in the manner set forth in step b,
 (f) stirring and eluting the streptokinase from the cellulose with a phosphate buffer having a molar concentration of from about 0.1 to 0.15.

2. In a process according to claim 1, in which the DEAE-cellulose is conditioned with a phosphate buffer having a molar concentration of 0.2.

3. In a process according to claim 1, in which the filtrate of step d is adjusted to a phosphate buffer molar concentration of from about 0.0175 to 0.025.

4. In a process according to claim 1, in which the filtrate of step d is adjusted to a protein concentration of from about 1 to 15 mg./ml.

5. In a process according to claim 1, in which the pH of the phosphate buffers employed in the process is from about 6 to 8.5.

6. In a process according to claim 1, in which the filtrate of step c is again contacted with a fresh portion of DEAE-cellulose, previously conditioned with a phosphate buffer having a molar concentration of from about 0.15 to 0.25, prior to adjusting the phosphate buffer molar concentration and protein concentration of the filtrate.

7. In a process according to claim 1, in which the elution step is repeated employing a phosphate buffer having a molar concentration of from about 0.1 to 0.15.

8. In a process according to claim 1, in which the impure streptokinase contains streptodornase.

9. In a process according to claim 8, in which the DEAE-cellulose from which the streptokinase has been eluted is suspended in a phosphate buffer having a molar concentration of 0.1, adjusting the pH from about 8.5 to 10.5, stirring and filtering the mixture, and retaining the filtrate which contains the sreptodornase.

10. In a process according to claim 9, in which the pH of the filtrate is adjusted to 7.5.

References Cited

UNITED STATES PATENTS 3,042,586  7/1962  Siegel et al. _____ 195—66
3,226,304  12/1965  Siiteri et al. _____ 195—62

LIONEL M. SHAPIRO, *Primary Examiner.*